United States Patent Office 3,361,452
Patented Jan. 2, 1968

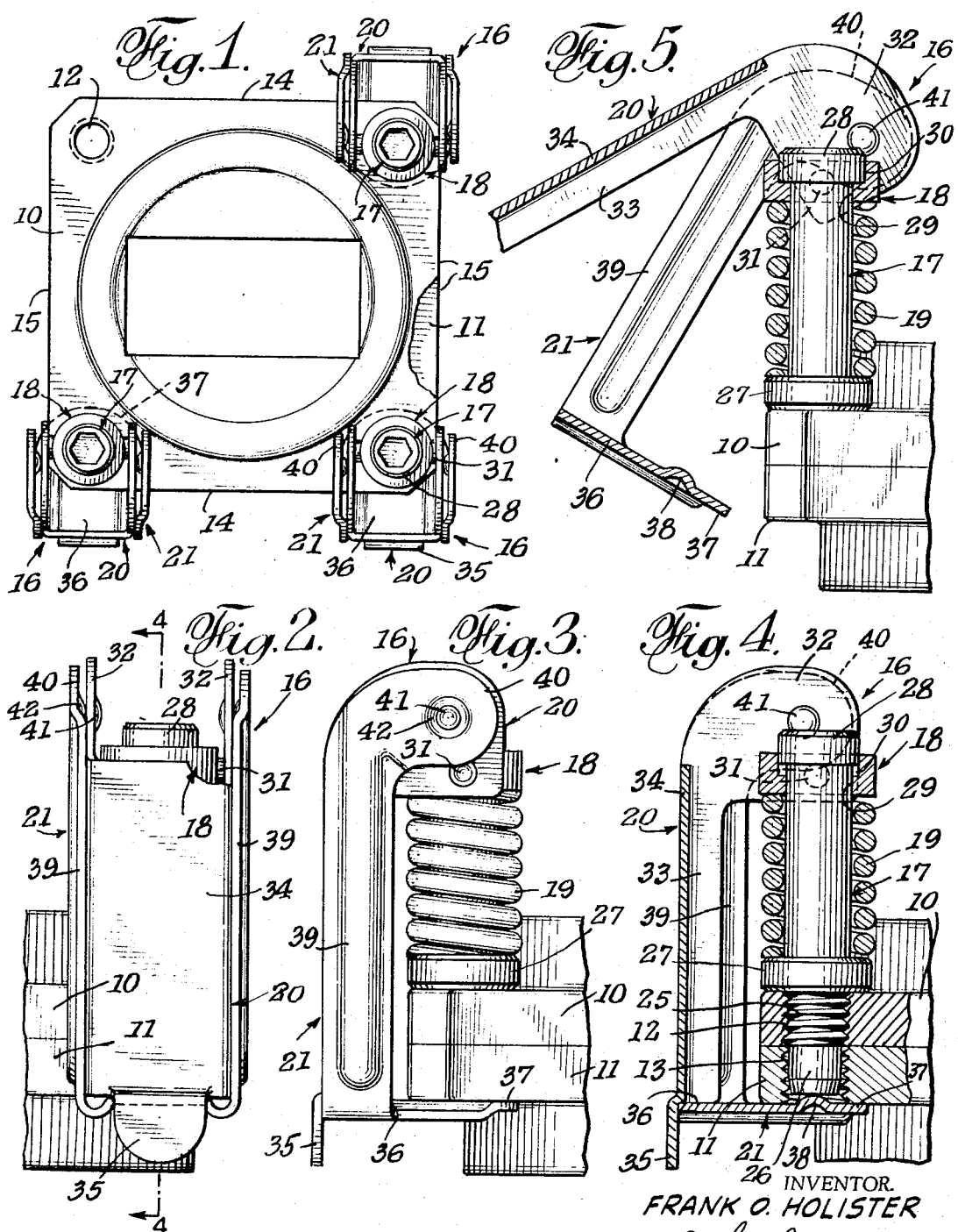

3,361,452
FAST-DISCONNECT CLAMP FOR CONDUIT FLANGES
Frank O. Holister, 32722 Seven Seas Drive, South Laguna, Calif. 92677
Filed Mar. 21, 1966, Ser. No. 536,011
8 Claims. (Cl. 285—312)

This invention relates to a fast-disconnect clamp for the contiguous mating flanges on the ends of conduits of various forms and purposes, but more particularly for firmly, rapidly and safely connecting waveguides in end-to-end relation, such conduits being used for conducting microwaves in radar and like electronic systems.

An object of the present invention is to provide a fast-disconnect clamp for sections of waveguides, or conduits of a comparable nature, that may be installed in any angular relationship to the sides of the rectangular flanges ordinarily provided on the ends of such sections, thereby affording flexibility of choice of the installed position, according to the clearance afforded between the waveguide and paralleling walls or bulkheads or between two or more waveguides disposed in cramped quarters.

In such close quarters, the side of the waveguide where most clearance occurs may be the only place that can accommodate a clamp, and frequently comparable clearance is not available at the opposite side. Another object of the invention is to provide a conduit clamp of the character referred to that may be installed so that any of the four sides of the connecting flanges are left clear to accommodate the clamp either when being installed or removed.

A further object of the invention is to provide a waveguide clamp that embodies an over-center or toggle lock that insures safe, firm, locking of connecting flanges and yet is capable, when so clamping the flanges, of being angularly moved around the axis of bolt holes with which the flanges are commonly provided for connecting bolts, which the present invention seeks to dispense with because they are too difficult to apply and remove and, moreover, cause considerable expenditure of time when being applied and removed.

This invention also has for its objects to provide such means that are positive in operation, convenient in use, easily installed in a working position and easily disconnected therefrom, economical of manufacture, relatively simple, and of general superiority and serviceability.

The above objects of the invention are realized in a fast-disconnect clamp device that comprises a headed stud adapted to be connected in the threaded hole of one flange of a pair of mating flanges and has a pilot extension that enters and has aligning engagement with a registering hole in the other of said flanges, a collar slidingly and rotationally engaged with the stud, with a spring biasing the collar toward the head, trunnions extending oppositely from the collar and in pivotal connection with the opposed ears on one end of an arm that is swingable on said connection toward and from a parallel position with relation to the stud, and a U-shaped clamp member having a clamp base end from which parallel legs extend, said legs having offset ears that are pivotally connected to the ears of the swingable arm on pivots that are offset from the pivotal connection between said collar and the swingable arm. The clamp member, with its clamp base engaged with the outer face of the flange that has the registering hole, has its pivotal connection with the swingable member so offset from the pivotal connection between the collar and said swingable member, that said first pivotal connection acts as a fulcrum on which the swingable member is movable toward a parallel relationship with the clamp member, the second pivotal connection swinging to an over-center position that causes the spring to become compressed by the collar and the swingable member to become a locking lever that is limited to its parallel position by engagement of its free end with the clamp base of the U-shaped member. The clamp base, thus locked to tightly hold the mating flanges engaged, may be swung or swiveled around the axis of the stud in different angular positions respecting the side edges of the flanges at the corners of which the stud holes are located. Such swiveled adjustment is retained by friction induced by the compressed spring and is facilitated by providing the clamp base with an embossment that enters the mentioned registering flange hole and, therefore, is coaxial with the stud.

The invention also comprises novel details of construction and novel combinations and arrangements of parts, which will more fully appear in the course of the following description, which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a plan view of a pair of mating conduit clamps with three clamps according to the invention, in clamping engagement therewith, a fourth clamp being omitted to show the corner at which the clamps are operatively applied.

FIG. 2 is an elarged elevational view showing the clamp in the lower right corner of the flanges in FIG. 1.

FIG. 3 is a side elevational view, as seen from the right of FIG. 2.

FIG. 4 is a vertical sectional view as taken on the line 4—4 of FIG. 2.

FIG. 5 is a similar sectional view showing the clamp in released position preparatory to being operatively moved to clamping engagement and locked in such position.

The square flanges 10 and 11 are typical of the ends of waveguides which are ordinarily connected by bolts applied in the respective holes 12 and 13 that are located at the corners where the opposite pairs of edges 14 and 15 meet. Said flanges 10 and 11 may be the mating or joining ends of conduits other than waveguides.

The present fast-disconnect clamps 16 replace the mentioned bolts for the purposes hereinabove mentioned. The clamp that is illustrated comprises, generally, a stud or post 17 that is mounted in one flange 10 and has registration engagement with the other flange 11, a collar 18 rotationally and slidingly mounted on said post, a spring 19 on said post and engaged with the collar to bias the same in a direction away from the flanges, a lever 20 pivotally connected to the collar, and a clamp member 21 pivotally connected to the lever 20 on a pivotal axis offset from the pivotal connection of the lever 20 to the collar 18.

The post 17 is provided with a threaded end 25 for engagement in the tapped hole 12 of the flange 10, a cylindrical pilot extension 26 of said end 25 entering the hole 13 of the flange 11 to hold the flanges in registration so that the microwave-conducting means of the waveguides are properly oriented or aligned as they would be if bolts were used in the holes 12 and 13. A flange 27 is provided on the post to serve as a bottoming port which limits the threaded engagement of the end 25 in the hole 12. At its upper end, the post is provided with a head 28 that is shown with a socket for a tool that sets the post in operative position. The flange 27 is stacked on the post 17 after assembly thereon of the collar 18 and the spring 19. The flange 27 may be secured to the post in other ways.

The collar 18 has a bore 29 with a sliding and rotative fit on the post and, preferably, a counterbore 30 of a size to receive the post head 28. As best seen in FIGS.

1 and 2, the collar is provided with oppositely directed trunnions 31.

The spring 19 is preferably in the form of a helix encircling the post with one end based on the flange 27 and the other biasing the collar 18 toward and into engagement with the head 28 of the post.

The lever 20, at one end, is provided with laterally directed ears 32 that are enlargements of flanges 33 on the longitudinal edges of a back wall 34. Said flanges 33 and wall 34 form the longitudinal portion of the lever. An outwardly offset tab 35 on the opposite end of the lever from the ears 32 constitutes a finger piece for moving the lever from its locked position, as will later become clear. The mentioned collar trunnions extend into apertures provided in the ears 32 to provide a pivotal connection on which said lever 20 is swingably movable on an axis intersecting the axis of the post 17.

The clamp member 21 is generally U-shaped, being formed to have a clamp base 36 that has a clamping extension 37 which is provided with an embossment 38, and a pair of parallel legs 39, embossed for strength, extending from the opposite side edges of said clamp base. The ends of said legs 39 have ears 40 that are offset in the same direction as the clamping extension 37 of the base 36. The space between said legs 39, as shown in FIGS. 1 and 2, smoothly accommodates the lever 20. Aligned pins 41 pivotally connect the ears 40 with the ears 32 of the lever 20, said connection being offset outwardly from the plane in which the axes of the post 17, and of the pivotal connection between the collar 18 and the lever 20, reside.

The above-described device is applied as follows: The post 17 is secured to the flange 10. Then, with the flange 11 in mating position, the clamp member 21 is swung down on the pivotal connection 41 with the ears 32 of the lever 20. This is readily accomplished, since the lever 20 has no fixed position on its pivotal connection with the collar 18. Now, the lever 20 is pulled down on its pivot, causing its connection 31 to be moved in an upward direction, thereby drawing the clamping extension 37 toward the outer face of the flange 11, and the embossment 38 on said extension will then extend into the hole 13. In this position of the parts, the spring 19 is still uncompressed with the pivot 41 to the right (as in FIG. 5) of the pivot 31. Now, it is necessary only to press downwardly on the free end of lever 20 so the same will pivot on the axis 41, causing the axis 31 and the collar 18 to move in a direction to compress the spring 19. When the axis 41 reaches a top dead center position with respect to the axis 31, the spring 19 will be at maximum compression so that, as the axis 41 passes said dead center position, the spring becomes effective to bias the collar 18 toward the post head 28. However, before the collar reaches its limit of movement, the lever 20 will be swung into the position of FIGS. 3 and 4 with the tab 35 abutting the outer edge of the clamp base 36. Now, the force of the compressed spring holds the lever 20 locked and the two flanges 10 and 11 are resiliently yet firmly held in contact.

Four such clamp devices, one at each corner of the flanges 10 and 11, will hold the same firmly connected, yet the same may be readily released for separation by using the tabs 35 to flip the levers 20 to opening position, which the spring 19 completes. An embossment 42 creates friction at the connection 41 between the ears 32 and 40, causing the release movement of the lever 20 to swing the clamp member 21 in a direction to withdraw the clamp bases 36 from the flanges 11.

Although the devices are firmly anchored and exert considerable friction between the post and collar and between the flange 10 and the clamping extension 37, the same are readily adjusted around the axis of the post to any angular position, or to a position parallel to either of the edges 14 or 15 of the flanges, as required by clearance conditions, as hereinbefore mentioned.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. A fast-release disconnect clamp for a pair of contiguous flanges having registering holes, at least one of which is tapped, said clamp comprising:
   (a) a post threadedly connected to the flange having the tapped hole and having an extension at one end in pilot engagement in the registering hole in the contiguous flange and a head on the opposite end, a collar flange being fixedly secured to the post at the portion thereof immediately adjacent the first-mentioned flange,
   (b) a collar rotationally and slidably mounted on the post between said head and collar flange and provided with oppositely extending pivot pins on a transverse line intersecting the axis of the post,
   (c) a spring around said post with one end abutting the collar flange and the other abutting the rotational and slidable collar to bias the latter toward the post head,
   (d) a lever pivotally connected to said collar on the mentioned pivot pins, and
   (e) a clamp member pivotally connected to the lever on a pivotal axis offset from the pivotal connection between the lever and the collar,
   (f) said clamp member having a clamp base that is drawn into engagement with the flange that has the registering hole when the lever is swung on its pivotal connection with the collar to move the pivotal connection between the clamp member and the lever from a position on one side of dead center of the axis of the post and an over-center position on the opposite side, the mentioned collar being depressed by such movement to compress the mentioned spring, storing energy therein that biases the clamp base tightly against the flange which it engages.

2. A fast-release disconnect clamp according to claim 1 in which the mentioned rotational and slidable collar is formed with a seat into which the lower end of the post head is rotationally and slidingly fitted.

3. A fast-release disconnect clamp according to claim 1 in which the mentioned lever on the end thereof connected to both the collar and the clamp member, is provided with parallel offset ears with which the two pivotal connections are engaged, means frictionally interengaging said ears and adjacent portions of the clamp member to cause the latter to be pivotally moved upon pivotal movement of the former.

4. A fast-release disconnect clamp according to claim 3 in which the last-mentioned means comprises inwardly directed embossments on the clamp member.

5. A fast-release disconnect clamp according to claim 1 in which the clamp member has a U-shaped form in which the clamp base comprises the base of the member and a pair of legs extend on each side from said base to pivotal connection with the ears of the lever.

6. A fast-release disconnect clamp according to claim 5 in which said clamp base is provided with an extension that has an embossment which enters the mentioned registering hole in the flange that is engaged by the clamp base.

7. A fast-release disconnect clamp according to claim 6 in which the last-mentioned embossment is disposed on the axis of the post, the clamp member, lever and collar being rotationally adjustable around said axis.

8. A fast-release disconnect clamp according to claim 5 in which the free end of the lever is provided with a tab extending beyond the level of the clamp base for finger engagement to move said lever from flange-locking to -releasing position.

References Cited

UNITED STATES PATENTS

| | | | |
|---|---|---|---|
| 1,143,321 | 6/1915 | Robinson | 285—364 |
| 1,233,170 | 7/1917 | Berry | 285—363 |
| 2,377,086 | 5/1945 | Lang | 85—5 |
| 2,536,602 | 1/1951 | Goett | 285—364 |
| 2,602,685 | 7/1952 | Martinet et al. | 285—364 |
| 2,645,506 | 7/1953 | Sturgis | 285—364 |
| 3,191,969 | 6/1965 | Wrenshall | 285—406 |

FOREIGN PATENTS

| | | |
|---|---|---|
| 1,219,291 | 5/1960 | France. |

CARL W. TOMLIN, *Primary Examiner.*

WAYNE L. SHEDD, *Assistant Examiner.*